United States Patent [19]
Tang et al.

[11] Patent Number: 5,325,110
[45] Date of Patent: Jun. 28, 1994

[54] MULTI-CONTROL POINT TOOL FOR COMPUTER DRAWING PROGRAMS

[75] Inventors: John C. Tang; Randall B. Smith; D. Austin Henderson, Jr., all of Palo Alto, Calif.

[73] Assignee: Xerox Corporation, Stamford, Conn.

[21] Appl. No.: 814,513

[22] Filed: Dec. 30, 1991

[51] Int. Cl.$^5$ ............................................. G09G 3/02
[52] U.S. Cl. ...................................... 345/157; 345/145
[58] Field of Search ............... 340/709, 707, 706, 710, 340/711, 712, 729, 731; 434/323; 395/159, 156; 345/157, 163, 173, 179, 180, 145, 139, 127, 131

[56] References Cited

U.S. PATENT DOCUMENTS

| | | | |
|---|---|---|---|
| 4,633,436 | 12/1986 | Flurry | 364/900 |
| 4,656,603 | 4/1987 | Dunn | 340/721 |
| 4,686,522 | 8/1987 | Hernandez et al. | 340/723 |
| 4,823,285 | 4/1989 | Blancato | 364/521 |
| 4,952,932 | 8/1990 | Sugino et al. | 340/712 |
| 4,985,152 | 1/1991 | Muller | 340/709 |
| 5,009,603 | 4/1991 | Fong et al. | 434/323 |
| 5,055,918 | 10/1991 | Berman | 340/729 |

Primary Examiner—Alvin E. Oberley
Assistant Examiner—Xiao M. Wu
Attorney, Agent, or Firm—Kenyon & Kenyon

[57] ABSTRACT

A method and apparatus for using and moving an tool, such as an eraser on a graphical display whose width can be changed. The invention provides a plurality of distinct areas on the tool that can be selected by a user input device, such as a stylus on an electronic tablet or a mouse. Selecting a first distinct area on the tool allows the user to move the tool without affecting the graphical images present on the display. Selecting the second distinct area on the tool allows the tool to modify the graphical image in a first manner (such as by providing a narrow line of erasure). Selecting a different distinct area on the tool allows it to modify the graphical image in a different manner (such as by providing a wider line of erasure). The orientation of the eraser can also be changed, simplifying several fine erasure applications.

48 Claims, 5 Drawing Sheets

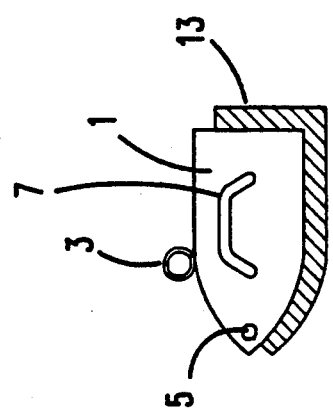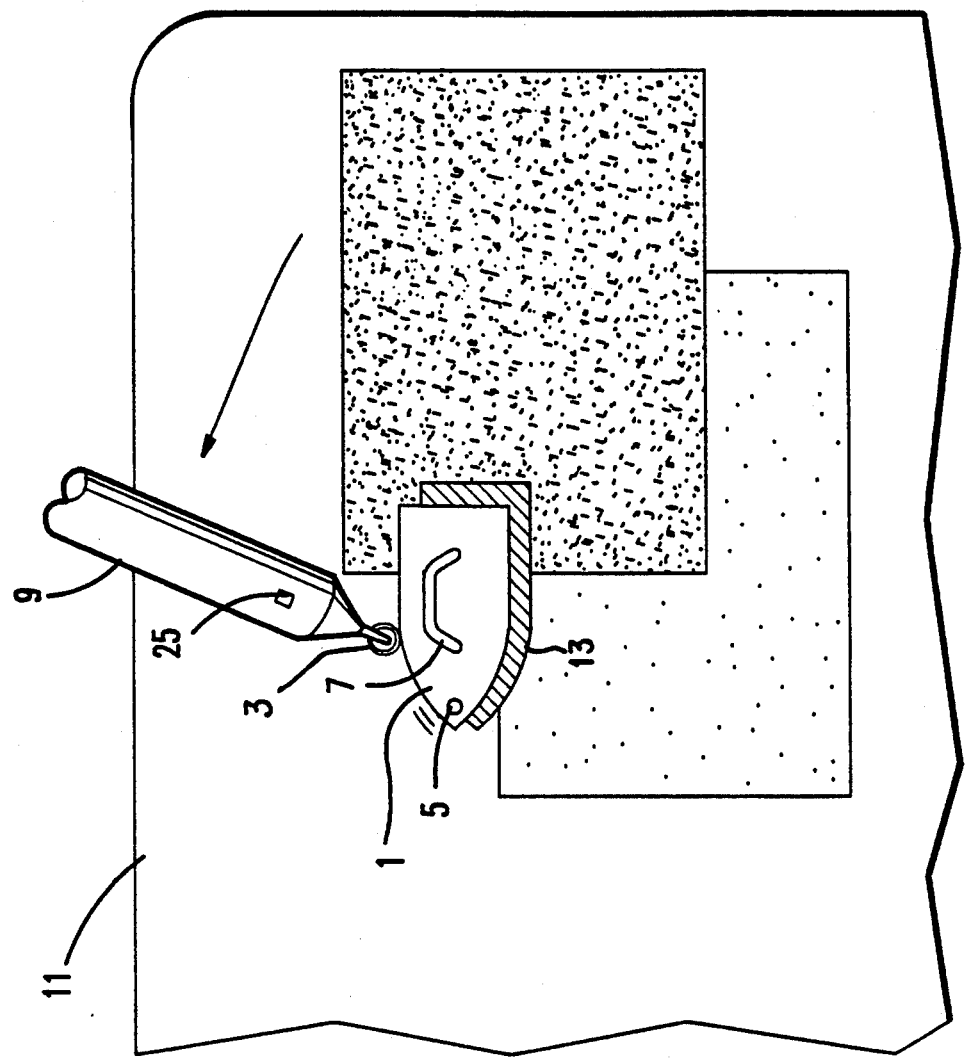

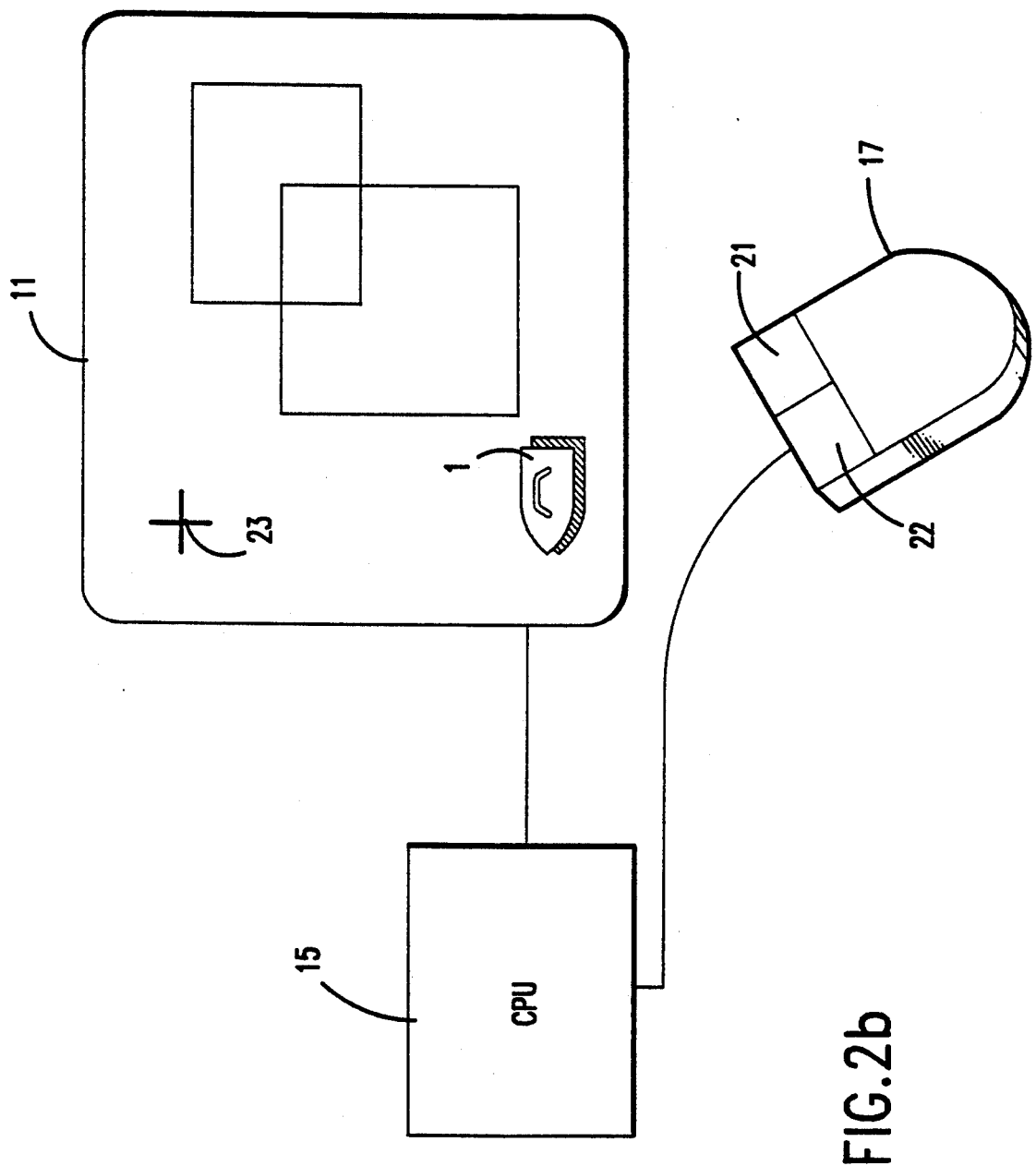

MULTI-CONTROL POINT TOOL FOR COMPUTER DRAWING PROGRAMS

BACKGROUND OF THE INVENTION

The present invention relates to an improvement in the creation and modification of graphical images on a computer screen or the like and, in particular, to a method for changing a characteristic function of an icon or tool with a cursor movement device or stylus.

One such tool often present in a computer graphics system is an eraser. In a computer graphics system, one of the more common methods of erasing parts of graphical images on a screen is by performing an erasure function using a cursor movement device, such as a mouse or a stylus with an electronic tablet. For instance, in U.S. Pat. No. 4,633,436 to Flurry (hereby incorporated by reference), a real-time erasing feature is described. In this method, user input via an electronic tablet and stylus combination is stored in a point list. When the disclosed system is placed in an erasing mode, the display screen is divided into a number of smaller grid boxes. Only grid boxes touched by the stylus are searched for erasure (and subsequent deletion from the point list).

Typically, the cursor is provided in the form of a graphical icon. For example, in the MacPaint ® graphics program manufactured by Apple ® Computer, Inc., the eraser icon resembles a chalkboard eraser. U.S. Pat. No. 4,823,285 to Blancato (hereby incorporated by reference) describes such a system. The erasing width of the eraser is usually constant, which may be too large when fine erasing is needed or too narrow when large portions of a graphical image are to be erased.

In some applications, the erasing width of the eraser can be changed using an external input device, such as a keyboard. Switching between modes using a keyboard can be tedious and impedes the process of freehand drawing. Also, most erasers have the same orientation at all times. This can make it difficult to precisely erase regions of a graphical image that cannot be reached by an effective point of the eraser. For example, if the eraser were to have an upright square shape, it would be difficult to erase a corner of a square graphical image not properly aligned with the eraser.

Accordingly, there is a need for a method which allows a user to quickly change the erasing width of a graphical eraser. There is also a need for a method which allows the user to quickly change the orientation of a eraser in a graphical drawing environment. More broadly, with respect to tools which are used for modifying an image, there is a need for a method which allows a user to quickly change the characteristics of the tool.

SUMMARY OF THE INVENTION

These needs are satisfied by the present invention. The computer system for implementing the method of the present invention comprises a central processing unit coupled to a cursor movement device or stylus and a display. The display can be a CRT screen, for instance. The width of the erasing swath of an eraser icon in a graphics image environment is determined by the cursor or stylus position on the eraser icon.

In a first embodiment of the present invention, there are three distinct areas on the eraser. The first area is a loop, and when the cursor or stylus is positioned in the loop, the eraser can be moved without erasing graphical images on the display. When selecting the second area, the eraser tip, a narrow erasure can be performed. When selecting the third area, the eraser handle, the erasing width is much larger (e.g., the width of the eraser, itself). The movement of the eraser in all three functions requires a first user input, such as depression of an input switch or the pressing of the stylus onto the graphical screen.

A shadow image can be provided with the eraser to indicate to the user what area of the eraser is in contact with the graphical images on the screen. For instance, if the loop area is selected, then the shadow image remains intact, indicating to the user that the eraser is not "touching" the graphical images on the screen. Also, the orientation of the cursor can be changed to make fine erasure somewhat easier.

In a second embodiment of the present invention, only two areas are provided on the eraser, one for narrow erasure and one for broad erasure. Two distinct user inputs are required, one for moving the eraser without affecting the graphical images on the display, and one for selecting an area on the eraser and the erasure width. This embodiment simplifies the shape of the eraser (by eliminating the loop), but requires two user input states, which may not be available on some input devices, such as a one button mouse, or a simple tip switch stylus.

BRIEF DESCRIPTION OF THE DRAWINGS

FIGS. 1a–d are screen displays of a graphical eraser, stylus, and graphical images which are to be partially erased.

FIGS. 2a and 2b are diagrams of two embodiments of a computer system for implementing the method of the present invention.

DETAILED DESCRIPTION

Figure 1C:
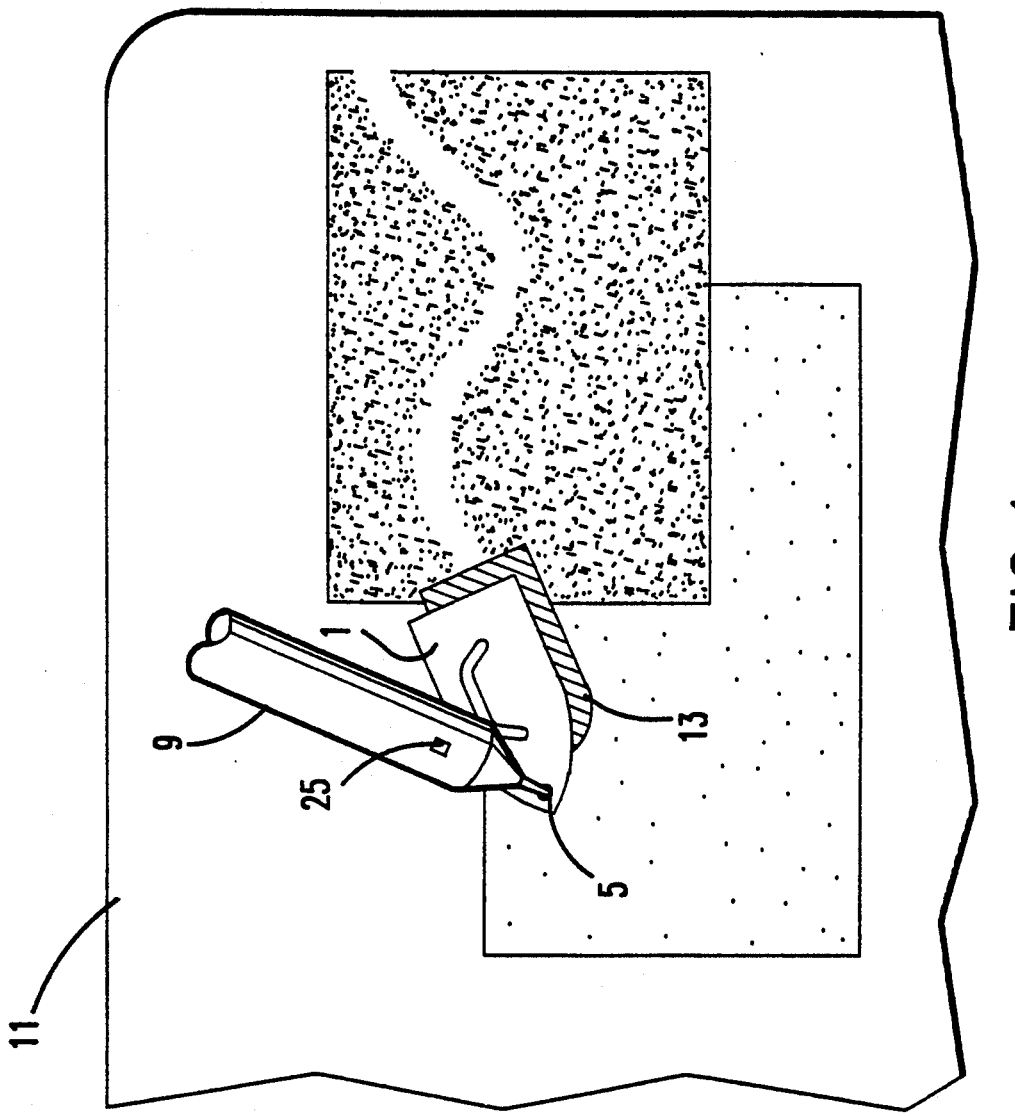

While the present invention will hereinafter be described in connection with a specific tool (an eraser) and a preferred method of use, it will be understood that it is not intended to limit the invention to that method of use. On the contrary, it is intended to cover all alternatives, modifications and equivalents as may be included within the spirit and scope of the invention as defined by the appended claims.

Referring to FIGS. 1a–d, graphical displays are shown. The graphical eraser 1 is in the shape of an old-style clothes iron having a plurality of distinct areas. (Other shapes can be chosen for the eraser, such as a boat hull shape, isosceles triangle or other closed polygon, for example.) In this embodiment of the present invention, there are three distinct areas on the eraser 1: the loop 3 attached to the eraser 1, the eraser tip 5, and the eraser handle 7. A cursor movement device is realized in this embodiment as a stylus 9 and can be positioned anywhere on an electronic tablet such as the graphical screen (shown generally as reference number 11). The graphical screen may be a screen display, such as a cathode ray tube (CRT) device or the like.

Referring to FIG. 1b, the eraser 1 can be moved without erasing any of the images appearing on the graphical screen 11 by using the first distinct area: the loop 3. To do so, the stylus 9 is first placed in the area of the loop 3. A user input, such as pressing the stylus 9 onto the graphical screen 11, causes the stylus to grab the eraser, activating an eraser function. Moving the stylus 9 while it is touching the graphical screen 11 and the loop 3 will now cause the eraser 1 to move across the graphical screen 11 without altering the present graphical images. A drop shadow image 13 may be provided to indicate to the user which function mode the eraser is in. While performing this non-erasing function, the shadow image 13 is full, which indicates to the user that the eraser 1 is not "touching" the graphical screen 11 but floating above it and thus, not erasing.

Referring to FIG. 1c, the eraser 1 can be changed to have a narrow erasing width by first placing the stylus 9 at the eraser tip 5. Again, a user input, such as pressing the stylus 9 against the graphical screen 11 in the area of the eraser tip 5, grabs the eraser and allows the stylus 9 to move the eraser 1 across the graphical screen 11. During this function, the shadow image 13 disappears in the area in close proximity to the eraser tip 5, indicating to the user that only a small portion of the eraser 1 is "touching" the graphical screen 11. As the eraser 1 is moved across the graphical screen 11, a narrow erasure is performed on the present graphical images along the path of the eraser tip 5.

Figure 1D:
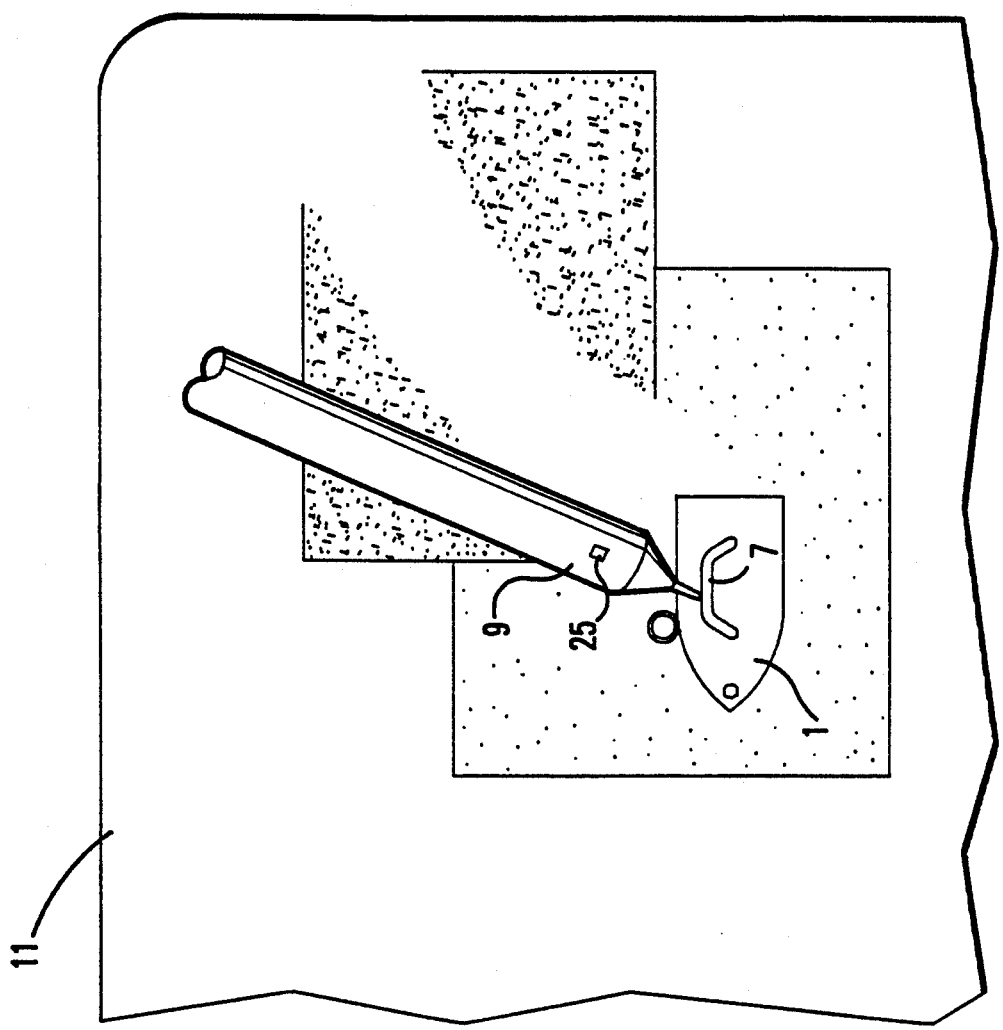

Referring to FIG. 1d, the eraser 1 can be changed to have a wide erasing width by first placing the stylus 9 on the eraser handle 7. A user input, as described above, allows the stylus 9 to grab the eraser and move the eraser 1 across the graphical screen 11. The shadow image 13 disappears during this function indicating to the user that the entire eraser 1 is "touching" the graphical screen 11. As the eraser 1 is moved across the graphical screen, a wide erasure is performed on the present graphic images along the path of the entire width of the eraser 1. In this mode, the erasure body stays in a fixed orientation relative to the graphics screen.

The orientation of the eraser 1 can also be changed using a cursor movement device. This becomes especially important when using the narrow erasing function of the present invention. For example, if a user desires to perform the narrow erasing function at the bottom of a graphical image, it is easier to perform if the eraser tip 5 is pointing upward. An example of changing the orientation of the eraser 1 is done by placing the cursor 9 on the eraser tip 5 and performing a hypothetical "dragging" of the eraser 1 through an imaginary viscous medium. Such a method for changing the orientation of a cursor can be found in the copending application of Smith et. al. filed on 27 Dec. 1991, entitled METHOD AND APPARATUS FOR SETTING A GRAPHICAL OBJECT'S POSITION AND ORIENTATION WITH VISCOUS DRAGGING, which is incorporated herein by reference in its entirety. In the embodiment that utilizes a loop, viscous dragging occurs only when the icon is manipulated at a vertex; otherwise, as in FIG. 1d, the erasure does not change its orientation as it is moved.

Figure 2A:
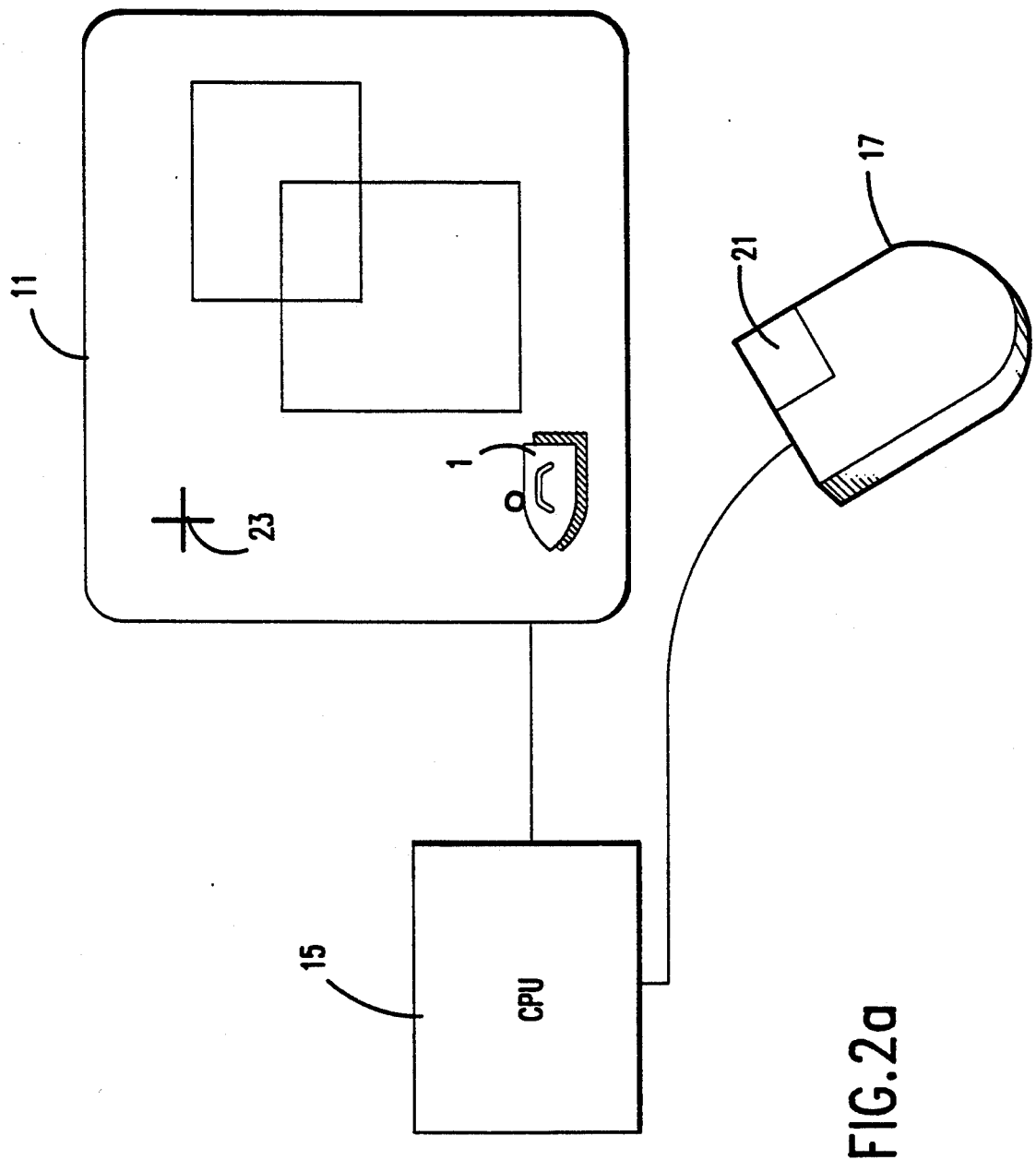

Referring to FIGS. 2a and 2b, a computer system is shown according to an embodiment of the present invention. The computer system includes a display 1, such as a CRT screen, a central processing unit (CPU) 15, which can be a personal computer, for example, and a cursor movement device. In this embodiment, the stylus 9 of FIGS. 1a-d has been replaced by a mouse 17. The present invention can be used with a variety of computer systems and input devices. In the embodiment of FIG. 2a, the mouse 17 includes a single input switch 21. In the embodiment of FIG. 2b, the mouse 17 includes first and second input switches 21 and 22, which, as is explained below, may preclude the need for a loop on the eraser. The operation of the system shall first be explained for the case where the mouse is equipped to provide only a single user input.

To perform the erasing functions of the present invention, a cursor 23 must be placed at the appropriate distinct area on the eraser 1 by the mouse 17 (FIG. 2a). To move the eraser 1 without erasing images on the graphical screen 11, the cursor 23 is first placed in the loop 3 of the eraser 1. A user input, such as the depression of the input switch 21, enables the mouse 17 to grab the eraser and move the eraser 1 to a desired location on the graphical screen 11 without erasing anything. Releasing the input switch 21 allows the user to move the cursor 23 without moving the eraser 1. Similarly, for a narrow erasure, the cursor 23 is first placed at the eraser tip 5, then the input switch 22 is depressed allowing the mouse 17 to control narrow erasure on the graphical screen 11. Comparable steps are executed to perform the wide erasure function.

By using additional user inputs, the eraser loop 3 can be eliminated. For example, if a push button 25 is provided on the barrel of the stylus 9, the stylus can be used to move the eraser 1, without erasing, while the push button 25 is depressed. Pressing the stylus onto one of the remaining distinct areas on the eraser 1 (e.g., the eraser tip 5) without depressing the push button 25 would initiate a narrow erasure function. Likewise with a two-input mouse 17, depression of the second input switch 22 allows the user to move the eraser 1 without erasing images on the graphical screen 11 (FIG. 2b). When depressing the first input switch 21 while the cursor 23 is in the area of the eraser handle 7 (for example), a wide erasure function is initiated.

By using additional user inputs to eliminate loop 3, one could utilize the second user input to enable the viscous drag feature that allows one to reorient the eraser—even when one is not in an erasure mode. This would entail movement of the cursor to a vertex on the icon.

Using the method and apparatus of the present invention allows a user to quickly and efficiently change the erasing width of an eraser in a graphical drawing application. The changing of the erasure width of the eraser and its orientation lends itself to a more natural control of the graphical display.

While this method has been explained chiefly in terms of an erasure function, it has applicability to any graphical operation that can be effected by the manipulation of a tool represented by an icon. An entire collection of tools could be provided in which some aspect of the feature provided by the tool as represented by the icon could be made to vary as a function of the side or graphically distinct area by which it is grabbed or otherwise controlled.

For example, instead of relating to a line of erasure, an icon could represent a painting tool. Such an icon could be provided as an n-sided polygon, in which each side of the polygon provides a different paint color. The icon would have the function of painting instead of erasure, and would provide a color corresponding to the color of the side or adjacent region of the polygon that one grabs. The polygon could be irregular, with the length of a side corresponding to the maximum width of the field of the painting provided. Such an icon could be manipulated using one or two user inputs in a manner similar to that set forth for erasure.

What is claimed is:

1. In a computer system, a method of controlling movement and function of a tool on a graphical display depicting a plurality of graphical images, comprising:
   displaying said tool at a selected location on said display, said tool including a plurality of distinct areas;
   positioning a cursor at a desired location within one of said plurality of distinct areas on said tool on said display;
   generating a user input signal, such that one of said plurality of distinct areas is selected in dependence on said location of said cursor;
   moving said tool along a desired path of motion on said display with said cursor movement device while said user input signal is present; and
   modifying the graphical images on said graphical display along said desired path of motion of said tool, such that the modifying effect of the tool on the images is a function of the distinct area of the tool selected.

2. The method of claim 1, wherein the tool is an eraser, the number of distinct areas on said eraser is three, and whereby in dependence upon which of the distinct areas of the eraser is selected, one selects the erasing width with which one erases portions of said graphical images on said graphical display along said desired path of motion of said eraser.

3. The method of claim 2, wherein if said user input signal is present and said first distinct area is selected, said erasure width is zero.

4. The method of claim 3, wherein if said user input signal is present and said second distinct area is selected, said erasure width is set to a first value, and if said third distinct area is selected, said erasure width is set to a second value, such that said second value is greater than said first value.

5. The method of claim 4, wherein if said user input signal is present and said second distinct area is selected, said location and orientation of said eraser are modified according to a hypothetical viscous dragging of the eraser through an imaginary medium.

6. The method of claim 2, further comprising:
   displaying a shadow image of said eraser in close proximity to said eraser on said graphical display.

7. The method of claim 6, wherein if said user input signal is present and said second distinct area is selected, a portion of said shadow image in close proximity to said second distinct area is eradicated.

8. The method of claim 7, wherein if said user input signal is present and said third distinct area is selected, said shadow image is eradicated.

9. In a computer system, a method of controlling movement and erasing width of an eraser on a graphical display depicting a plurality of graphical images, comprising:
   displaying said eraser at a selected location on said display, said eraser including first and second distinct areas;
   positioning a cursor at a desired location within one of said first and second distinct areas on said eraser on said display;
   generating one of a first and second user input signals, such that if said first user input signal is generated, one of said first and second distinct areas is selected in dependence on said location of said cursor;
   moving said eraser along a desired path of motion on said display with said cursor movement device while one of said first and second user input signals is present; and
   erasing portions of said graphical images on said graphical display along said desired path of motion of said eraser while said first user input signal is present, such that an erasing width of said eraser depends from said selected distinct area on said eraser.

10. The method of claim 9, wherein if said first user input signal is present and said first distinct area is selected, said erasure width is set to a first value, and if said first user input signal is present and said second distinct area is selected, said erasure width is set to a second value, such that said second value is greater than said first value.

11. The method of claim 10, wherein if said first user input signal is present and said first distinct area is selected, said location and orientation of said eraser are modified according to a hypothetical viscous dragging of the eraser through an imaginary medium.

12. The method of claim 9, further comprising:
   displaying a shadow image of said eraser in close proximity to said eraser on said graphical display.

13. The method of claim 12, wherein if said first user input signal is present and said first distinct area is selected, a portion of said shadow image in close proximity to said first distinct area is eradicated.

14. The method of claim 13, wherein if said first user input signal is present and said second distinct area is selected, said shadow image is eradicated.

15. The method of claim 9, wherein if the second user input is present, said erasure width is zero.

16. A computer system, comprising:
   a central processing unit;
   a cursor movement device coupled to said central processing unit, said cursor movement device capable of controlling positioning of a cursor on a display;
   a graphical display coupled to said central processing unit, said graphical display capable of displaying graphical images, said graphical display capable of displaying an eraser at a desired location having first, second, and third distinct areas, such that said cursor movement device is capable of positioning said cursor at a desired location within one of said first, second, and third distinct areas on said eraser on said graphical display; and
   said cursor movement device is capable of generating a user input signal, such that one of said first, second, and third distinct areas is selected in dependence on said location of said cursor, said cursor movement device is capable of moving said eraser along a desired path of motion on said graphical display while said user input signal is present and erasing portions of said graphical images on said graphical display along said desired path of motion of said eraser, such that an erasing width of said eraser depends from said selected distinct area on said eraser.

17. The apparatus of claim 16 wherein said cursor movement device is a mouse device.

18. The apparatus of claim 17, wherein if said user input signal is present and said first distinct area is selected, said erasure width is zero.

19. The apparatus of claim 18, wherein if said user input signal is present and said second distinct area is selected, said erasure width is set to a first value, and if said third distinct area is selected, said erasure width is set to a second value, such that said second value is greater than said first value.

20. The apparatus of claim 17, wherein if said user input signal is present and said second distinct area is selected, said location and orientation of said eraser are modified according to a hypothetical viscous dragging of the eraser through an imaginary medium.

21. The apparatus of claim 18, wherein said graphical display displays a shadow image of said eraser in close proximity to said eraser on said graphical display.

22. The apparatus of claim 18, wherein if said user input signal is present and said second distinct area is selected, a portion of said shadow image in close proximity to said second distinct area is eradicated.

23. The apparatus of claim 22, wherein if said user input signal is present and said third distinct area is selected, said shadow image is eradicated.

24. A computer system, comprising:
a central processing unit;
a cursor movement device coupled to said central processing unit, said cursor movement device capable of controlling positioning of a cursor on a display;
a graphical display coupled to said central processing unit, said graphical display capable of displaying graphical images, said graphical display capable of displaying an eraser at a desired location having first and second distinct areas, such that said cursor movement device is capable of positioning said cursor at a desired location within one of said first and second distinct areas on said eraser on said graphical display; and
said cursor movement device is capable of generating first and second user input signals, such that when said first user input signal is generated one of said first and second distinct areas is selected in dependence on said location of said cursor, said cursor movement device is capable of moving said eraser along a desired path of motion on said graphical display while one of said first and second user input signals is present and while said first user input signal is present, said eraser erases portions of said graphical images on said graphical display along said desired path of motion of said eraser, such that an erasing width of said eraser depends from said selected distinct area on said eraser.

25. The apparatus of claim 24, wherein said cursor movement device is a mouse device.

26. The apparatus of claim 25, wherein if said first user input signal is present and said first distinct area is selected, said erasure width is set to a first value, and if said first user input signal is present and said second distinct area is selected, said erasure width is set to a second value, such that said second value is greater than said first value.

27. The apparatus of claim 26, wherein if said first user input signal is present and said first distinct area is selected, said location and orientation of said eraser are modified according to a hypothetical viscous dragging of the eraser through an imaginary medium.

28. The method of claim 25 wherein said graphical display displays a shadow image of said eraser in close proximity to said eraser on said graphical display.

29. The method of claim 28, wherein if said first user input signal is present and said first distinct area is selected, a portion of said shadow image in close proximity to said first distinct area is eradicated.

30. The method of claim 29, wherein if said first user input signal is present and said second distinct area is selected, said shadow image is eradicated.

31. The method of claim 24, wherein if the second user input is present, said erasure width is zero.

32. A computer system, comprising:
a central processing unit;
a stylus coupled to said central processing unit;
a graphical display including an electronic tablet coupled to said central processing unit, said graphical display capable of displaying graphical images, said graphical display capable of displaying an eraser at a desired location having first, second, and third distinct areas, such that said stylus is capable of selecting within one of said first, second, and third distinct areas on said eraser on said graphical display; and
said stylus is capable of generating a user input signal, such that one of said first, second, and third distinct areas is selected in dependence on said location of said stylus, said stylus is capable of moving said eraser along a desired path of motion on said graphical display while said user input signal is present and erasing portions of said graphical images on said graphical display along said desired path of motion of said eraser, such that an erasing width of said eraser depends from said selected distinct area on said eraser.

33. The apparatus of claim 32, wherein if said user input signal is present and said first distinct area is selected, said erasure width is zero.

34. The apparatus of claim 33, wherein if said user input signal is present and said second distinct area is selected, said erasure width is set to a first value, and if said third distinct area is selected, said erasure width is set to a second value, such that said second value is greater than said first value.

35. The method of claim 34, wherein if said user input signal is present and said second distinct area is selected, said location and orientation of said eraser are modified according to a hypothetical viscous dragging of the eraser through an imaginary medium.

36. The apparatus of claim 32, wherein said graphical display displays a shadow image of said eraser in close proximity to said eraser on said graphical display.

37. The apparatus of claim 36, wherein if said user input signal is present and said second distinct area is selected, a portion of said shadow image in close proximity to said second distinct area is eradicated.

38. The apparatus of claim 35, wherein if said user input signal is present and said third distinct area is selected, said shadow image is eradicated.

39. A computer system, comprising:
a central processing unit;
a stylus coupled to said central processing unit;
a graphical display including an electronic tablet coupled to said central processing unit, said graphical display capable of displaying graphical images, said graphical display capable of displaying an eraser at a desired location having first and second distinct areas, such that said stylus is capable of selecting one of said first and second distinct areas on said eraser on said graphical display; and
said stylus is capable of generating first and second user input signals, such that when said first user input signal is generated one of said first and second distinct areas is selected in dependence on said location of said stylus, said stylus is capable of moving said eraser along a desired path of motion on said graphical display while one of said first and second user input signals is present and while said first user input signal is present, said eraser erases portions of said graphical images on said graphical display along said desired path of motion of said eraser, such that an erasing width of said eraser depends from said selected distinct area on said eraser.

40. The apparatus of claim 39, wherein if said first user input signal is present and said first distinct area is selected, said erasure width is set to a first value, and if said first user input signal is present and said second distinct area is selected, said erasure width is set to a second value, such that said second value is greater than said first value.

41. The apparatus of claim 40, wherein if said first user input signal is present and said first distinct area is selected, said location and orientation of said eraser are modified according to a hypothetical viscous dragging of the eraser through an imaginary medium.

42. The method of claim 40 wherein said graphical display displays a shadow image of said eraser in close proximity to said eraser on said graphical display.

43. The method of claim 42, wherein if said first user input signal is present and said first distinct area is selected, a portion of said shadow image in close proximity to said first distinct area is eradicated.

44. The method of claim 43, wherein if said first user input signal is present and said second distinct area is selected, said shadow image is eradicated.

45. The method of claim 39, wherein if the second user input is present, said erasure width is zero.

46. In a computer system, a method of controlling movement and function of a tool on a graphical display depicting a plurality of graphical images, comprising:

displaying said tool at a selected location on said display, said tool including a plurality of distinct areas;

positioning a cursor at a desired location within one of said plurality of distinct areas on said tool on said display;

generating one of a first and second user input signals, such that if said first user input signal is generated, one of said plurality of distinct areas is selected in dependence on said location of said cursor;

moving said tool along a desired path of motion on said display with said cursor movement device while one of said first and second user input signals is present; and modifying the graphical images on said graphical display along said desired path of motion of said tool, such that the modifying effect of the tool on the images is a function of the distinct area of the tool selected.

47. The method of claim 46, wherein the tool is a painting tool whereby in dependance upon the selection of the location on the tool, one selects the painting width of the tool.

48. The method of claim 46, wherein the tool is a painting tool whereby in dependance upon the selection of location on the tool, one selects the color with which the tool paints.

* * * * *